United States Patent
Shiraishi

(10) Patent No.: US 11,153,507 B2
(45) Date of Patent: Oct. 19, 2021

(54) IMAGE PROCESSING APPARATUS, IMAGE PROCESSING METHOD, IMAGE PROVIDING SYSTEM, AND NON-TRANSITORY COMPUTER-READABLE RECORDING MEDIUM STORING IMAGE PROCESSING PROGRAM

(71) Applicant: KYOCERA Document Solutions Inc., Osaka (JP)

(72) Inventor: Takanori Shiraishi, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 16/812,480

(22) Filed: Mar. 9, 2020

(65) Prior Publication Data
US 2020/0304725 A1 Sep. 24, 2020

(30) Foreign Application Priority Data
Mar. 20, 2019 (JP) .............................. JP2019-053117

(51) Int. Cl.
*H04N 7/18* (2006.01)
*H04N 5/232* (2006.01)
*H04N 5/247* (2006.01)

(52) U.S. Cl.
CPC ......... *H04N 5/247* (2013.01); *H04N 5/23296* (2013.01); *H04N 7/181* (2013.01); *H04N 7/188* (2013.01)

(58) Field of Classification Search
CPC .................................................. H04N 5/247
See application file for complete search history.

(56) References Cited

U.S. PATENT DOCUMENTS

| 10,771,744 B2* | 9/2020 | Yamashita | G06K 9/00342 |
| 2012/0169882 A1* | 7/2012 | Millar | G08B 13/19608 348/159 |
| 2013/0194421 A1* | 8/2013 | Kita | G06K 9/00228 348/143 |
| 2013/0242113 A1* | 9/2013 | Tanaka | H04N 5/232933 348/169 |
| 2013/0286254 A1* | 10/2013 | Watanabe | H04N 5/3572 348/239 |

(Continued)

FOREIGN PATENT DOCUMENTS

| JP | 2000-101833 | 4/2000 |
| JP | 2008-199587 | 8/2008 |
| JP | 2009-268065 | 11/2009 |

*Primary Examiner* — Irfan Habib
(74) *Attorney, Agent, or Firm* — Lex IP Meister, PLLC

(57) ABSTRACT

An image processing apparatus includes an image extraction image data input unit, a frame image data extraction unit, and an angle of view adjustment unit. The image extraction image data input unit accepts, in parallel with photography to acquire moving image data, image extraction image data representing a still image and acquired by photographing an event. The frame image data extraction unit extracts frame image data from the moving image data using extraction information included in the image extraction image data. The angle of view adjustment unit adjusts an angle of view to an angle of view region in an image represented by the frame image data, based on angle of view setting information included in the image extraction image data.

6 Claims, 10 Drawing Sheets

(56) References Cited

U.S. PATENT DOCUMENTS

| | | | |
|---|---|---|---|
| 2013/0342699 A1* | 12/2013 | Hansen | H04N 7/188 348/157 |
| 2014/0183948 A1* | 7/2014 | Hulbert | H02J 7/00 307/23 |
| 2015/0220749 A1* | 8/2015 | Cronholm | G06F 1/1686 726/30 |
| 2015/0294183 A1* | 10/2015 | Watanabe | G07C 9/28 382/203 |
| 2016/0275534 A1* | 9/2016 | Iwai | H04N 7/188 |
| 2017/0332050 A1* | 11/2017 | Yamashita | H04N 5/23219 |

* cited by examiner

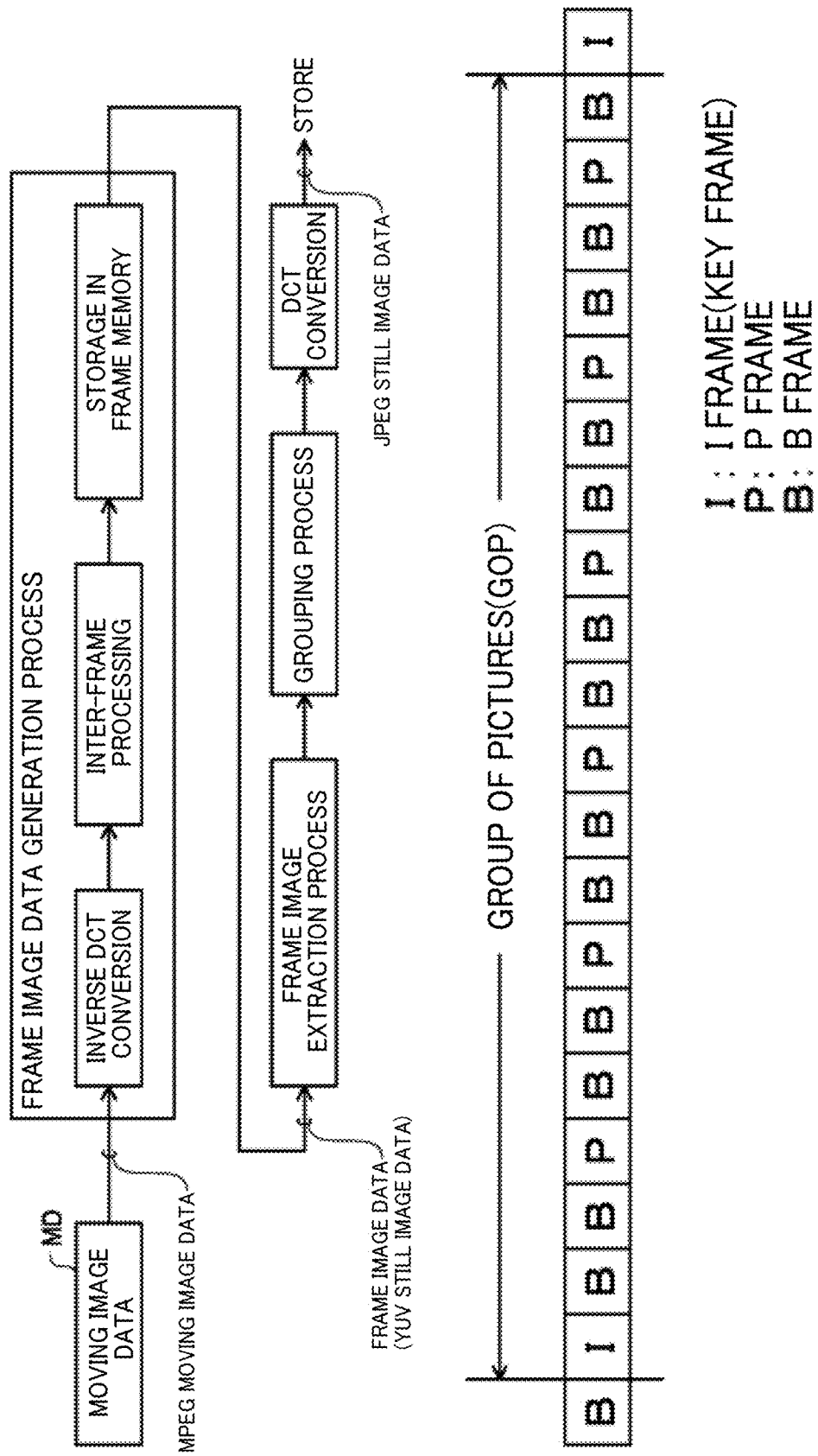

EXAMPLE OF ANGLE OF VIEW ADJUSTMENT PROCESS

ANOTHER EXAMPLE OF ANGLE OF VIEW ADJUSTMENT PROCESS

ANGLE OF VIEW SETTING PROCESS(DRAGGING OPERATION)

ANGLE OF VIEW ADJUSTMENT PROCESS(PINCH-OUT OPERATION)

IMAGE PROCESSING APPARATUS, IMAGE PROCESSING METHOD, IMAGE PROVIDING SYSTEM, AND NON-TRANSITORY COMPUTER-READABLE RECORDING MEDIUM STORING IMAGE PROCESSING PROGRAM

INCORPORATION BY REFERENCE

This application is based upon and claims the benefit of priority from the corresponding Japanese Patent Application No. 2019-053117 filed on Mar. 20, 2019, the entire contents of which are incorporated herein by reference.

BACKGROUND

The present disclosure relates to an image processing apparatus, an image processing method, an image providing system, and a non-transitory computer-readable recording medium storing an image processing program.

Various techniques have been proposed for development, printing, and enlargement (DPE) services. For example, there is a known technique for storing information of image processing of an original image at the time of making a previous print and search information used for searching information of an original image corresponding to information of image processing of the original image at the time of making a print. According to this technique, it is possible to stably output an image reproduced by the previous print and a reprint in which an image having a suitable color or density match is reproduced by a simple operation. Also, there is a known image processing method capable of generating a natural complementary image when a portion of an image is deleted from an image captured by a digital camera or the like and a deleted part is supplemented with complementary pixels to generate a complementary image, even when the deleted part is to be supplemented with an image having a complicated shape or is to be supplemented with an image that does not exist in a non-deleted part. On the other hand, there is a known technique for continuously displaying captured images including objects with high correlation among a plurality of moving images. According to this technique, images of the same person picked up by different image pickup apparatuses can be continuously displayed.

An object of the present disclosure is to provide an image desired by a user by making it possible to improve the image quality and adjust the angle of view while reducing the burden of photography at an event.

SUMMARY

The present disclosure provides an image processing apparatus to provide an image extracted from moving image data acquired by photographing an event as a subject. The image processing apparatus includes an image extraction image data input unit, a frame image data extraction unit, and an angle of view adjustment unit. The image extraction image data input unit accepts, in parallel with photography to acquire the moving image data, image extraction image data representing a still image and acquired by photographing the event. The frame image data extraction unit extracts frame image data from the moving image data using extraction information included in the image extraction image data, the frame image data being acquired at a timing corresponding to acquirement of the image extraction image data. The angle of view adjustment unit adjusts, based on angle of view setting information included in the image extraction image data, an angle of view to an angle of view region in an image represented by the frame image data, the angle of view region being indicated by the angle of view setting information.

BRIEF DESCRIPTION OF THE DRAWINGS

FIG. 7 is a data flow diagram showing the contents of a frame image data generation process according to an embodiment.

DETAILED DESCRIPTION

Hereinafter, embodiments of the present disclosure will be described with reference to the drawings.

Figure 1:
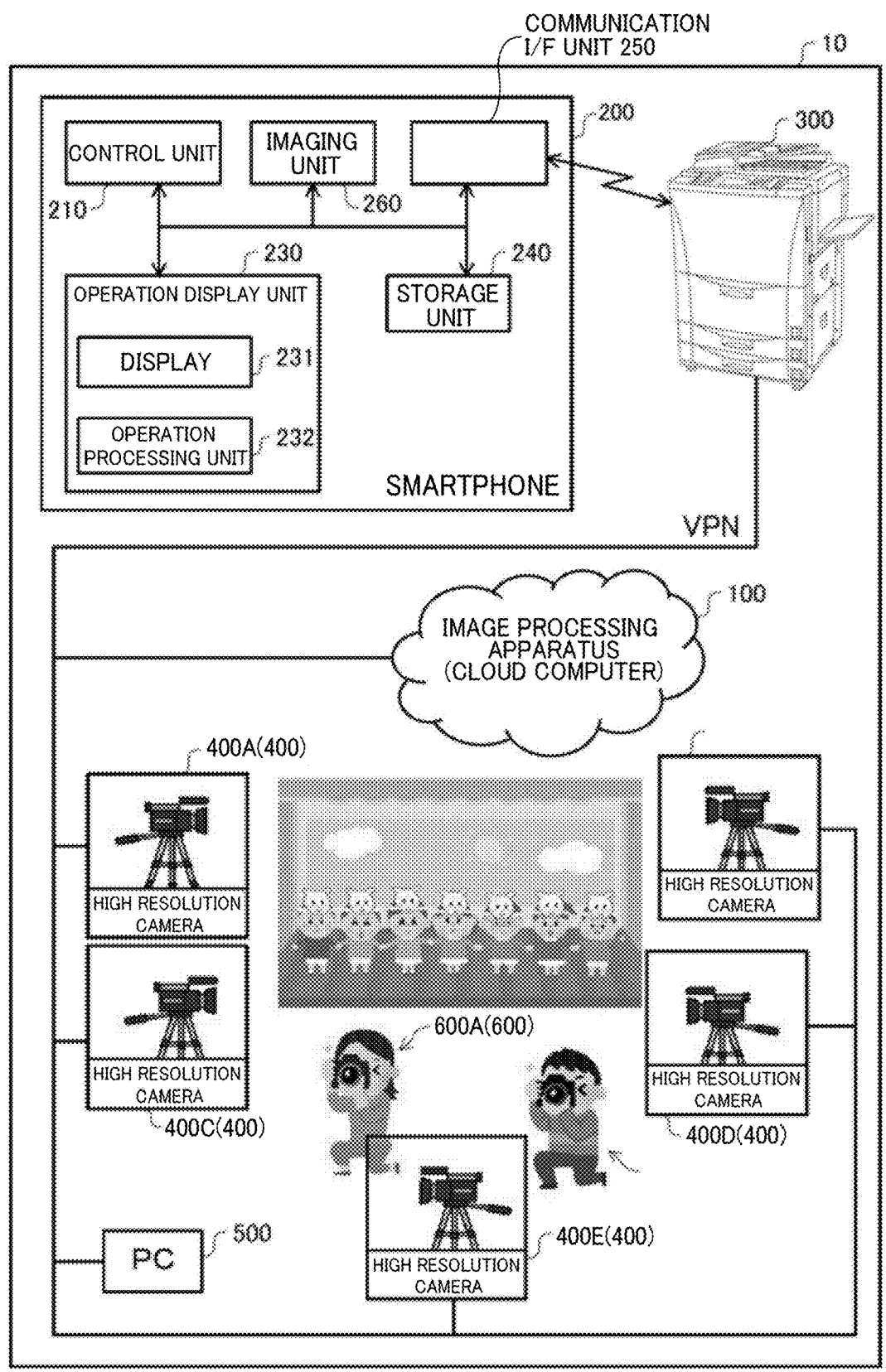
FIG. 1 is a block diagram showing a functional configuration of an image providing system according to an embodiment of the present disclosure.

FIG. 1 is a block diagram showing a functional configuration of an image providing system 10 according to an embodiment of the present disclosure. The image providing system 10 includes an image processing apparatus 100 configured as a cloud computer, a smartphone 200, an image forming apparatus 300, a plurality of (five in this example) commercial high-resolution video cameras 400 (400a to 400e), a personal computer (also referred to simply as "PC") 500, and a digital camera 600 (600a or 600b) owned by a user.

The commercial high-resolution video cameras 400 are each also called a high-resolution camera or a moving image data acquiring device, and may be 8K cameras or 16K cameras. In this example, the commercial high-resolution video cameras 400 are so set as to photograph one and the same preschool performance show as a subject at mutually different angles. The digital camera 600 is assumed to have a zooming function and a telephotographic function.

The image processing apparatus 100 is connected to the image forming apparatus 300 and the commercial high-resolution video cameras 400 by a virtual private network (VPN) via the Internet. The image forming apparatus 300 is, for example, a printer, a multifunction printer, or a multifunction peripheral.

The smartphone 200 includes a control unit 210, an operation display unit 230, a storage unit 240, a communication interface unit (also referred to as "communication I/F unit") 250, and an imaging unit 260. The smartphone 200 is connected to the image forming apparatus 300 and the digital camera 600 by short-range wireless communication using the communication interface unit 250. The short-range wireless communication used in this embodiment is of Bluetooth (registered trademark) Class 2 system. The Bluetooth (registered trademark) Class 2 system is a short-range wireless communications system with a power of 2.5 mW that allows communications between the image forming apparatus 300 and the smartphone 200 distant from each other by about 10 m or less.

The operation display unit 230 of the smartphone 200 includes a display 231 and an operation processing unit 232. The display 231 functions as a touch panel and displays various menus as an input screen. The operation processing unit 232 accepts a user's operation input from the display 231 functioning as a touch panel, as well as various buttons and switches (not shown).

The imaging unit 260 is Exif standard-compliant and stores the generation date and time (DateTimeOriginal) of original image data and the GPS data in image data files. The generation date and time of the original image data are essentially usable as photography date and time, and are also called photography date and time information. As a result, in each image data file acquired by photography with the smartphone 200, information representing the date and time as well as position of the photography can automatically be stored. According to the Exif standard, the photography date and time are recorded in seconds.

Figure 2:
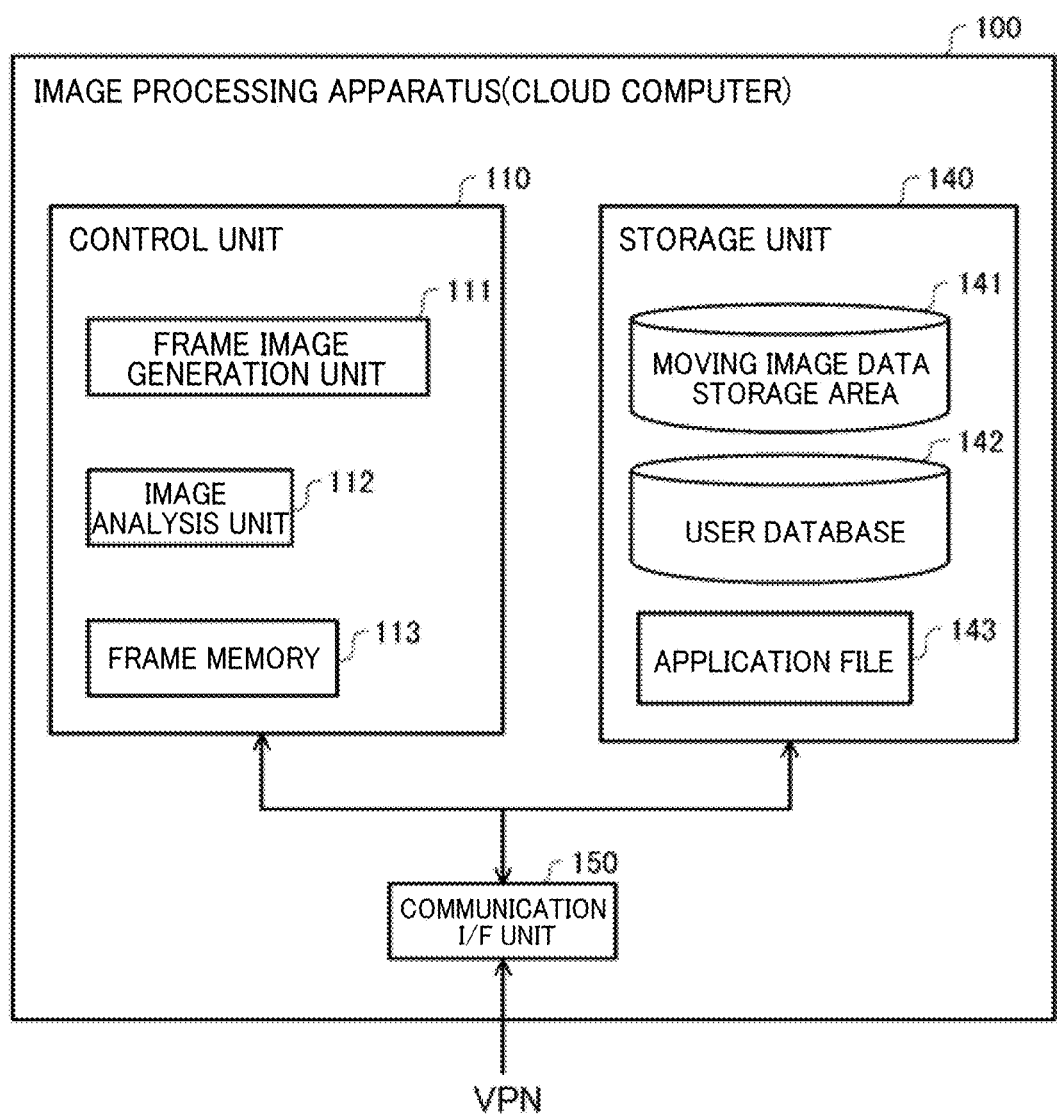
FIG. 2 is a block diagram showing a functional configuration of an image processing apparatus according to an embodiment.

FIG. 2 is a block diagram showing a functional configuration of the image processing apparatus 100 according to an embodiment. The image processing apparatus 100 includes a control unit 110, a storage unit 140, and a communication interface unit (also referred to as "communication I/F unit") 150. The control unit 110 includes a frame image generation unit 111, an image analysis unit 112, and a frame memory 113. The frame image generation unit 111 and the image analysis unit 112 function as a frame image data extraction unit.

The control units 110 and 210 each include a main storage means such as a RAM and a ROM, and a control means such as a micro processing unit (MPU) and a central processing unit (CPU). The control units 110 and 210 each have a controller function related to interfaces of various I/Os, universal serial buses (USBs), buses, and other hardware. The control unit 110 controls the entire image processing apparatus 100. The control unit 210 controls the entire smartphone 200.

The storage units 140 and 240 are storage devices composed of hard disk drives, flash memories or the like, which are non-transitory storage media, and store control programs and data for processing executed by the control units 110 and 210, respectively. The storage unit 140 further includes a moving image data storage area 141 for storing frame image data, a user database 142, and an application file 143. The moving image data storage area 141 stores moving image data generated by the commercial high-resolution video cameras 400. The user information and the settlement information are registered in the user database 142.

Figure 3:
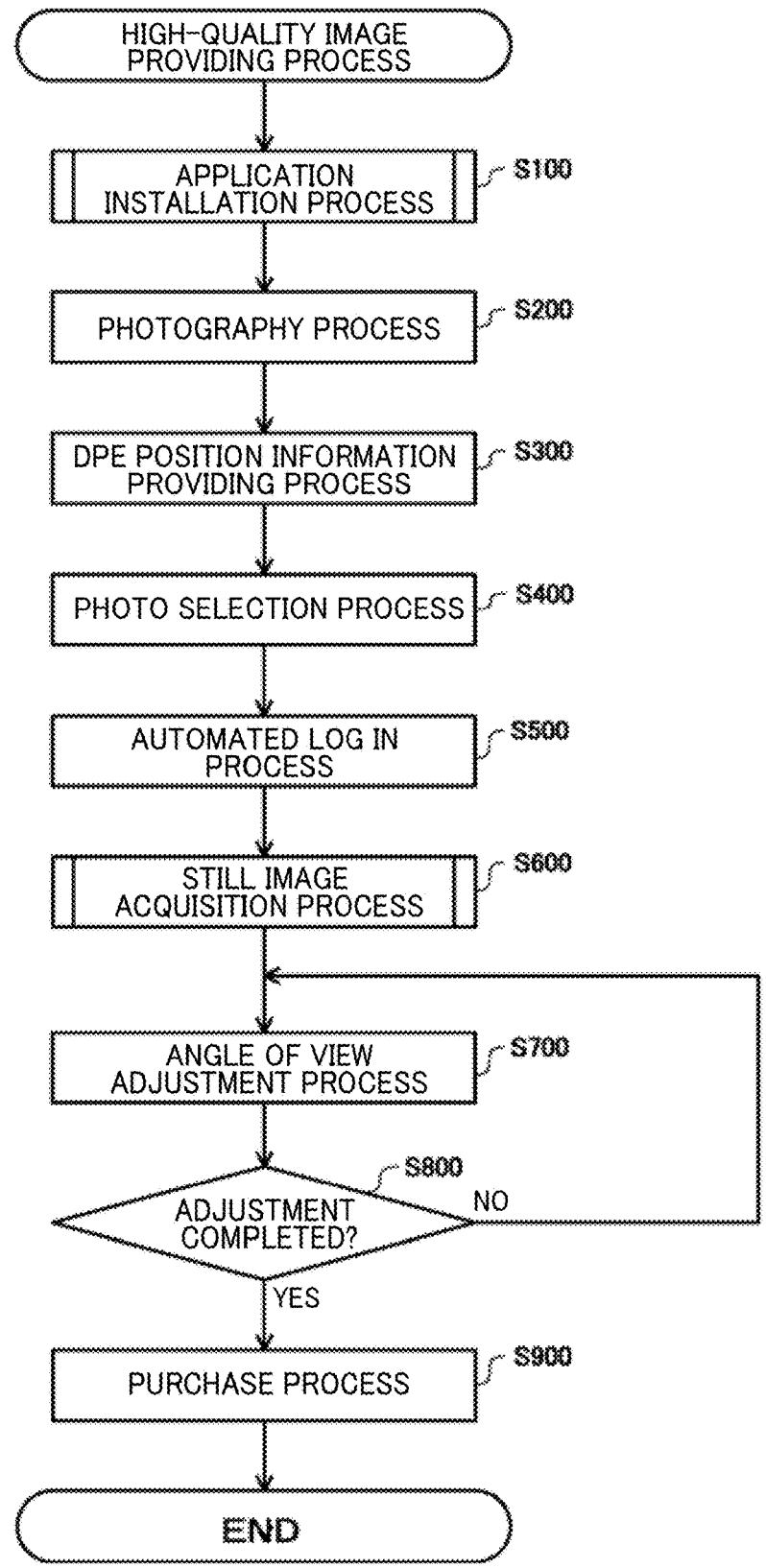
FIG. 3 is a flowchart showing the contents of a high-quality image providing process according to an embodiment.

FIG. 3 is a flowchart showing the contents of a high-quality image providing process according to an embodiment. The high-quality image providing process is a process for providing high-quality image data of the same scene as the image captured by the digital camera 600. The high-quality image data is provided from the commercial high-resolution video cameras 400 via the image processing apparatus 100. In this example, it is assumed that the photography by parents at a preschool performance show is a target of high-quality image providing process.

In step S100, the smartphone 200 executes an application installation process. In the application installation process, the smartphone 200 installs an application used in the high-quality image providing process using the application file 143. The personal computer 500 broadcasts a beacon packet for installation.

Figure 4:
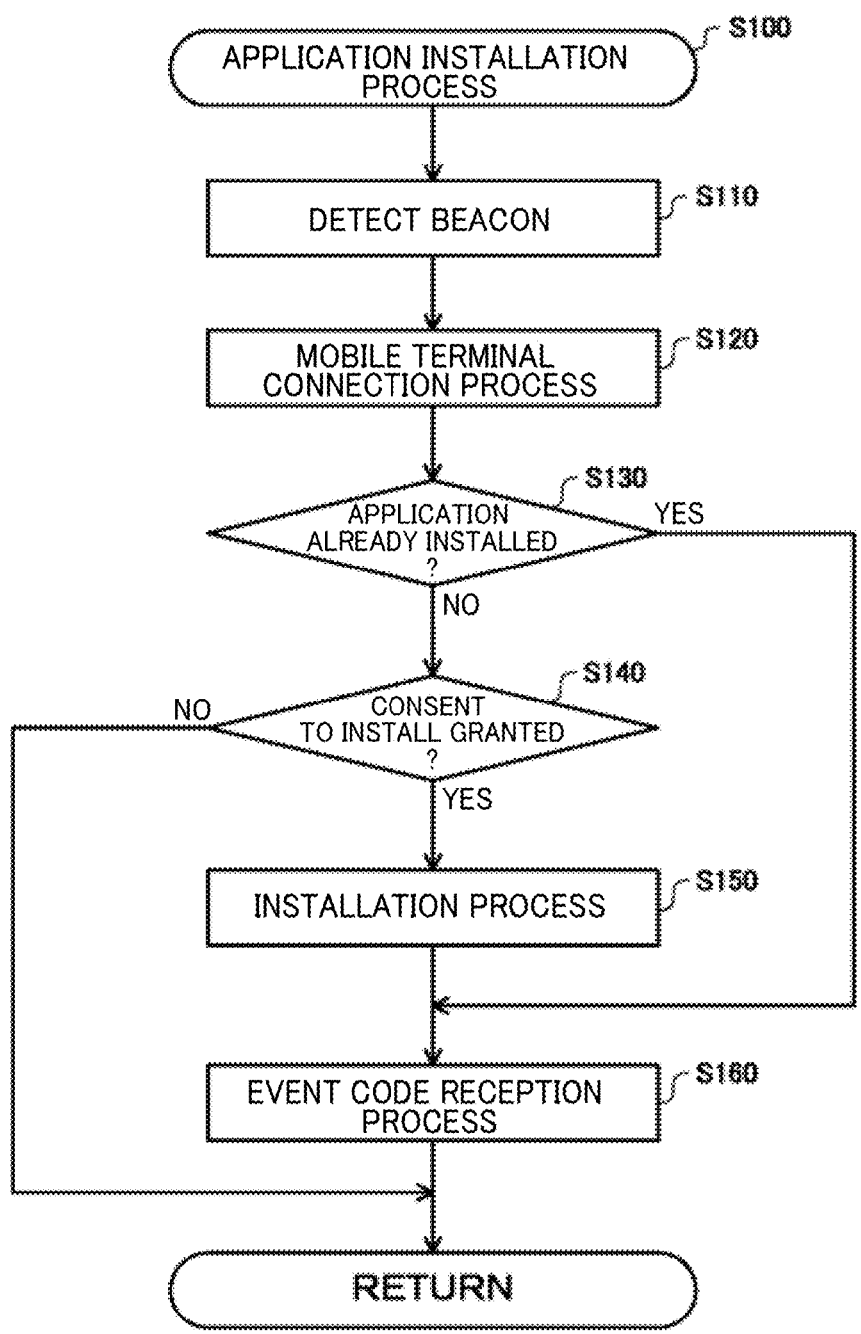
FIG. 4 is a flowchart showing the contents of an application installation process according to an embodiment.
Figure 5:
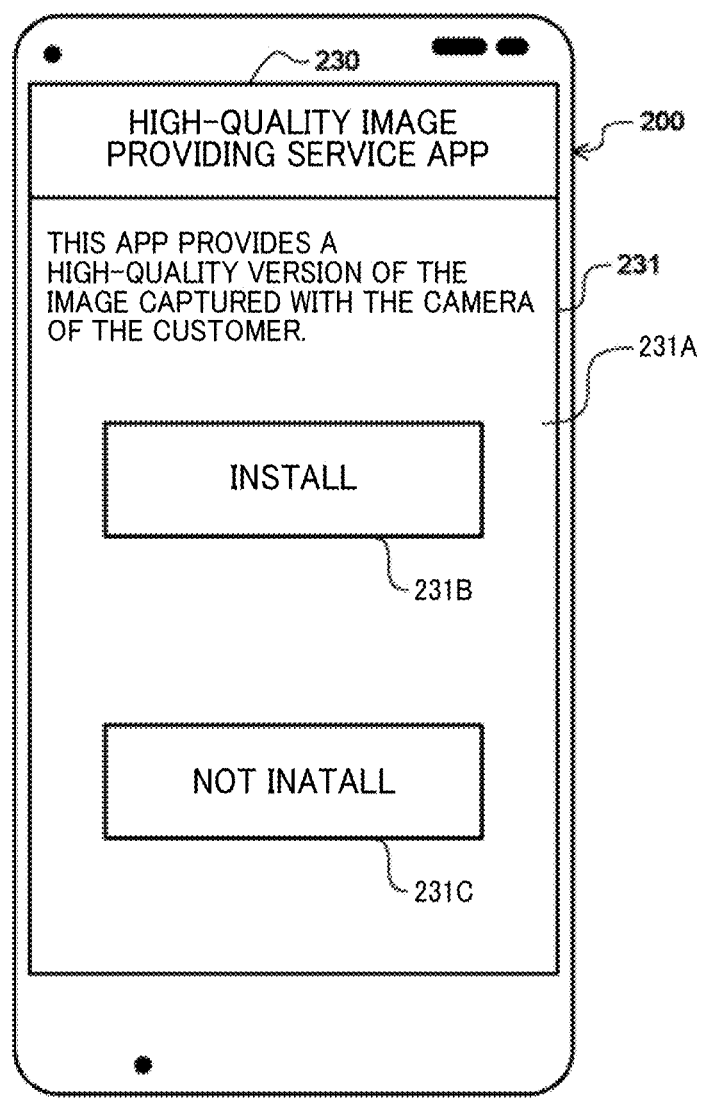
FIG. 5 is an explanatory diagram showing an application installation screen according to an embodiment.

FIG. 4 is a flow chart showing the contents of an application installation process (step S100) according to an embodiment. FIG. 5 is an explanatory diagram showing an application installation screen according to an embodiment. It is assumed that the preschool performance show is registered in advance in the image processing apparatus 100 as an event to be photographed, together with the holding date and time as well as place of the show.

In the step S110, the smartphone 200 receives, in the holding place of the preschool performance show, the beacon packet transmitted from the personal computer 500 installed by the provider of the high-quality image providing process in the holding place of the preschool performance show. The beacon packet includes information required for connecting radio communications, such as BSSID and SSID information, channel information, and a list of supported transmission speeds, beacon transmission intervals, security information, and other information.

In step S120, the smartphone 200 executes a mobile terminal connection process. In the mobile terminal connection process, the smartphone 200 as a mobile terminal automatically carries out wireless communication connection with the personal computer 500. The wireless communication connection is generally carried out through an association procedure or an authentication procedure using information obtained from a beacon packet. The smartphone 200 notifies the owner of the smartphone 200 that the preschool performance show is to be provided with a high-quality image providing service by means of a push notification by vibration or display of the user interface screen 231a on the display 231 of the smartphone 200, as shown in FIG. 5.

In step S130, the personal computer 500 inquires of the smartphone 200 whether or not the application has been installed. If the application is not installed yet, the smartphone 200 advances the processing to step S140; if the application has already been installed, the smartphone 200 skips the installation process (step S150) and advances the processing to step S160.

In the step S140, the smartphone 200 displays a user interface screen 231a for requesting consent to install the application on the display 231 of the operation display unit 230. The user selects either consent by touching the OK icon 231b or non-consent by touching the cancel icon 231c. When the consent is selected, the smartphone 200 advances the processing to step S150, and when the non-consent is selected, the smartphone 200 ends the process.

In step S150, the smartphone 200 executes an installation process. In the installation process, the smartphone 200 downloads the application file 143 from the image processing apparatus 100 via the personal computer 500, and installs the application file 143 using the application file 143.

In step S160, the smartphone 200 executes an event code reception process. In the event code reception process, the smartphone 200 receives an event code representing the preschool performance show as an event and a password, and advances the processing to step S200. As a result, the smartphone 200 can smoothly receive the high-quality image data providing service of the preschool performance show.

In the step S200, the five commercial high-resolution video cameras 400 start, in response to the start of the preschool performance show, capturing high-resolution images of the preschool performance show as the identical subject at photography angles mutually different in the state where the video cameras 400 are fixed. The commercial high-resolution video cameras 400 upload the moving image data to the image processing apparatus 100 via the virtual private network VPN. On the other hand, the user uses the digital camera 600 (600a or 600b) owned by the user to photograph a desired subject (e.g., a child of the user) at a desired angle of view and at desired timings (scenes) by using the zooming function or the telephotographic function.

In step S300, the image processing apparatus 100 executes a DPE position information providing process. In the DPE position information providing process, the image processing apparatus 100 provides position information of a service provider (e.g., a convenience store) that provides DPE printing and high-quality image data to the smartphone 200 in response to the end of the preschool performance show. As a result, the user can know a place where a photograph or image data of a high-quality image can be received. The location information may be provided as route guidance.

In step S400, the user executes a photo selection process. In the photo selection process, the smartphone 200 acquires image data from the digital camera 600 in advance via short-range wireless communication or a connection code. The user selects image data desired to be subjected to DPE printing or high-quality image data from the acquired image data, which is also called original image data or image extraction image data. The image extraction image data includes still image data generated from moving image data acquired by a video camera (not shown) of the user.

In step S500, the smartphone 200 performs an automated log-in process in response to users arriving at, for example, a convenience store. In the automatic login process, the smartphone 200 can automatically login to the image forming apparatus 300 using the event code and the password. The image forming apparatus 300 can provide copying processing and the like to other users in parallel.

In step S600, the smartphone 200 executes a still image acquisition process. In the still image acquisition process, the smartphone 200 can acquire high-quality image data using the original image data selected in the step S400. The image processing apparatus 100 receives original image data from the smartphone 200 using the communication interface unit 150 functioning as an image data input unit for image extraction.

Figure 6:
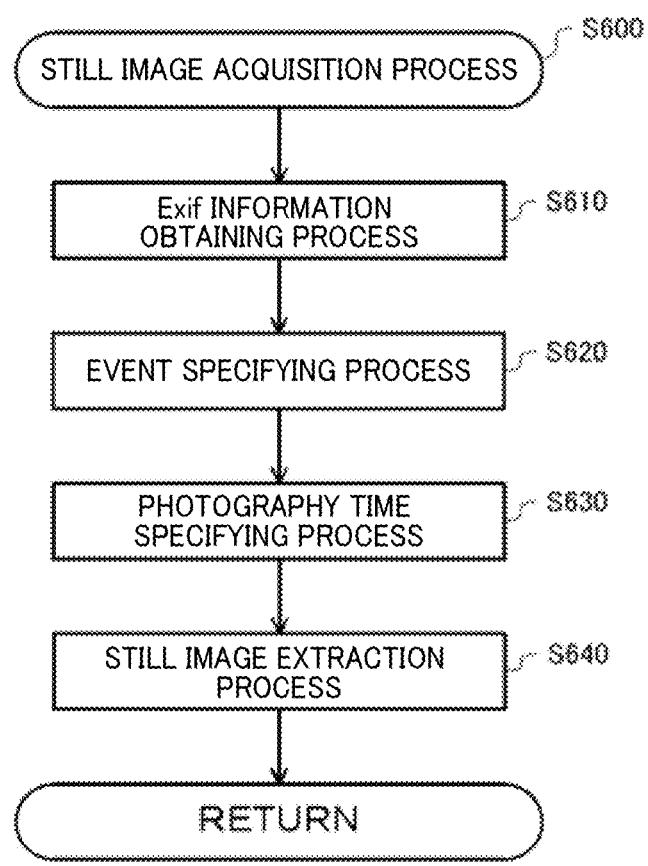
FIG. 6 is a flowchart showing the contents of a still image acquisition process according to an embodiment.

FIG. 6 is a flow chart showing the contents of a still image acquisition process (step S600) according to an embodiment. The still image acquisition process is a process of acquiring still image data from moving image data acquired by the commercial high-resolution video cameras 400 using original image data acquired by the user using the digital camera 600.

In step S610, the smartphone 200 executes an Exif information obtaining process. In the Exif information obtaining process, the smartphone 200 obtains the photography date and time and the GPS data from the Exif information of the selected original image data. The photography date and time and the GPS data are transmitted from the smartphone 200 to the image processing apparatus 100 together with the event code.

In step S620, the image processing apparatus 100 executes an event specifying process. In the event specifying process, the image processing apparatus 100 specifies an event based on the event code, and selects moving image data of the specified event. When the smartphone 200 does not acquire the event code, the image processing apparatus 100 can specify the event based on the photography date and time and the GPS data.

In step S630, the image processing apparatus 100 executes a photography time specifying process. In the photography time specifying process, the image processing apparatus 100 specifies the photography time in seconds based on the photography date and time (Exif data). The photography date and time are used as extraction information when still image data is extracted from moving image data.

In step S640, the image processing apparatus 100 executes a still image extraction process. In the still image extraction process, a still image is selected and extracted based on the photography time. The still image is acquired as frame image data of moving image data acquired by the commercial high-resolution video cameras 400.

FIG. 7 is a data flow diagram showing the contents of a frame image data generation process according to an embodiment. In FIG. 7, a data flow diagram is shown on the upper side, and a group of pictures (GOP) is shown on the lower side. The data flow diagram shows the flow of frame image data from the moving image data MD. The frame image data is constructed as YUV image data. The frame image data generation process is a process for extracting a plurality of pieces of frame image data from the moving image data MD, and is executed by the frame image generation unit 111.

The frame image data generation process includes, for example, a process defined in MPEG-4 (ISO/IEC 14496) or H.264. In the frame image data generation process, the frame image generation unit 111 generates frame image data from an intra-coded frame (I frame), a predicted frame (P frame), and a bi-directional predicted frame (B frame).

The I frame is a frame that is encoded without inter-frame prediction. The I frame is also called an intranet frame or a key frame. The I frame constitutes a GOP together with the P frame and the B frame. The P frame enables generation of frame image data by inter-frame processing with the I frame and the P frame. The B frame enables generation of frame image data by inter-frame processing with the I frame, the P frame, and another B frame before and after the B frame in question.

The moving image data MD is generated from a plurality of pieces of frame image data arranged in chronological order. In many cases, a plurality of pieces of frame image data are approximate between a preceding frame and a following frame in a time series. The inter-frame prediction is a technique of predicting a current frame image from a preceding frame image in a time series by utilizing the property of the moving image data MD.

Specifically, this is a technique for estimating the movement of each pixel block and increasing the compression rate in GOP units by subjecting the difference in pixel block between the frames after the movement to DCT conversion and quantization. The P frame can be reconstructed from the I frame using motion vectors. The motion vector is a movement vector of each pixel block.

The frame image generation unit 111 performs inverse discrete cosine transform (also referred to as "inverse DCT conversion") on the I frame to generate frame image data as YUV image data including luminance data and color difference data. The inverse DCT conversion is performed for each 8×8 pixel or 16×16 pixel block, for example.

The frame image generation unit 111 generates difference data by performing inverse discrete cosine transform on the P frame and the B frame. The frame image generation unit 111 performs inter-frame processing using the difference data and the motion vector to generate frame image data. The motion vector is data generated at the time of encoding the moving image data MD. This process is a normal decoding process defined in MPEG-4 or H.264.

The frame image generation unit 111 executes the frame image data generation process based on the P frame and the B frame, and stores a plurality of pieces of frame image data before and after the photography date and time of the original image in the frame memory 113. When storing the pieces of frame image data in the frame memory 113, the frame image generation unit 111 stores each piece of frame image data as a candidate piece of frame image data in the frame memory 113 of the control unit 110 by associating a number representing the chronological order of the relevant piece of frame image data with the relevant piece of frame image data. In this example, the photography date and time are used as extraction information.

In step S700, the user can perform an angle of view adjustment process on the smartphone 200. In the angle of view adjustment process, the user can adjust the angle of view of the original image F1 represented by the original image data acquired by the digital camera 600 owned by the user, including adjustment of the angle of view outside the frame without being limited to the original image data.

Further, in the present embodiment, since the commercial high-resolution video cameras 400 are so set as to photograph the same preschool performance show as a subject at mutually different angles, the photography angle for the subject can also be selected. More specifically, in the present embodiment, it is also possible to select the commercial high-resolution video camera 400 which is close to the direction of the line of sight of a preschooler as a subject. The angle of view adjustment in the present specification has a broad meaning, and includes such selection of the photography angle (for the photography from above, from below, from the right or from the left).

Figure 8A:
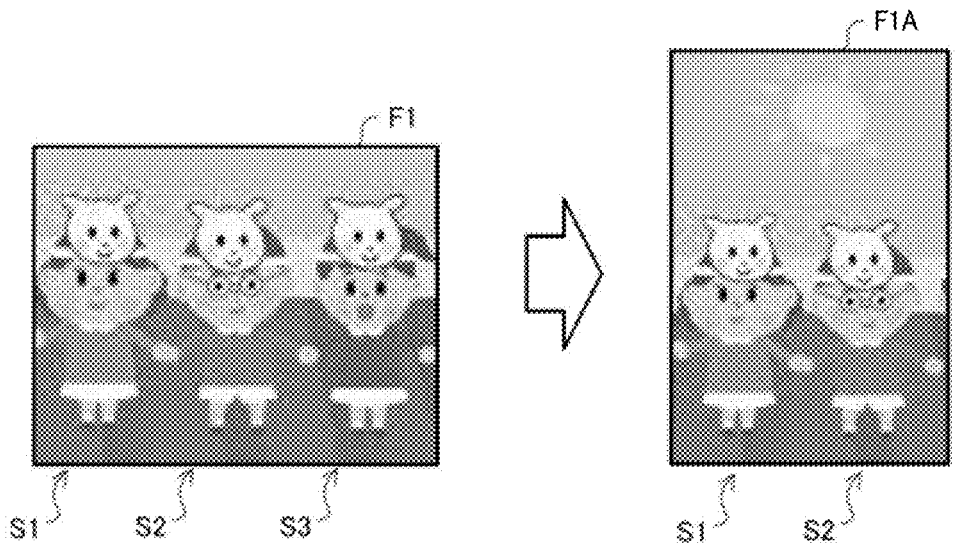
FIGS. 8A and 8B are explanatory diagrams each showing an angle of view adjustment process according to an embodiment.
Figure 8B:
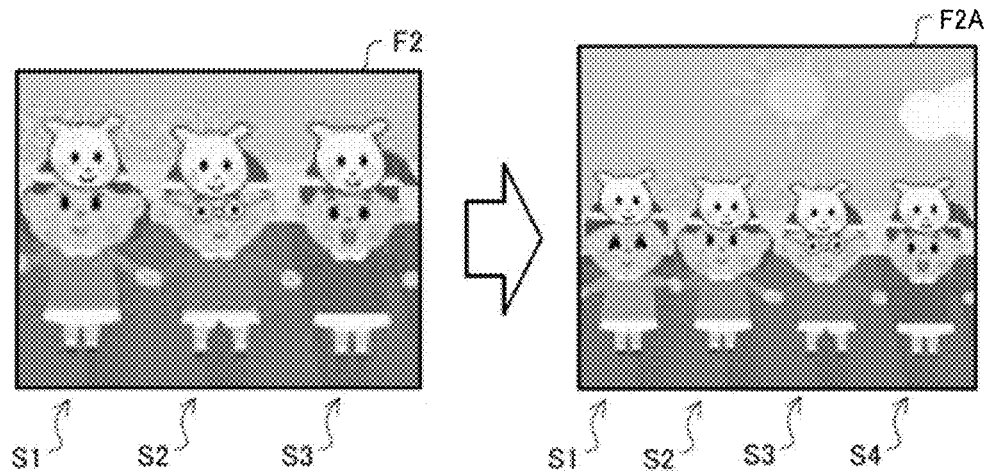

FIGS. 8A and 8B are explanatory diagrams showing an angle of view adjustment process according to an embodiment. FIG. 8A shows an example of the angle of view adjustment process. The original image F1 is formed to have an angle of view including three subjects S1, S2, and S3 using a zooming function or a telephotographic function. The angle of view (the angle of view region in the still image) is used as the angle of view setting information in the image processing apparatus 100 functioning as the angle of view adjustment unit.

The image analysis unit 112 analyzes the candidate pieces of frame image data, and searches the candidate pieces of frame image data for an angle of view (candidate image region) including the three subjects S1, S2, and S3. The image analysis unit 112 can detect a person (subjects S1, S2, and S3) using, for example, a well-known open source computer vision library (OpenCV).

Specifically, the image analysis unit 112 can calculate a feature quantity quantitatively representing a feature of a person based on, for example, an histograms of oriented gradients (HOG) feature or a Haar-Like feature. Machine-learning such as support vector machine (SVM) can also be used to calculate the features. The image processing apparatus 100 extracts at least one candidate piece of frame image data that has a candidate image region.

The image analysis unit 112 transmits a plurality of candidate pieces of frame image data each including a candidate image region to the smartphone 200. The smartphone 200 extracts a plurality of candidate image regions from the candidate pieces of frame image data as transmitted, and displays the extracted candidate image regions and the original image F1 side by side on the display 231. The candidate image regions are set based on the angle of view setting information.

The user can select a desired candidate image region from a plurality of candidate image regions as listed and adjust the angle of view. In this example, the user adjusts the angle of view to delete the subject S3, and includes a picture of the sun in the angle of view as the vertical length as the high-quality image Fla.

FIG. 8B shows another example of the angle of view adjustment process. In the angle of view adjustment process, the user enlarges the angle of view of the original image F2 to include a picture of the sun in the frame, and includes the subject S4 in the angle of view to form a high-quality image Fla. In this way, the angle of view adjustment process makes it possible to improve the image quality and capture images outside the frames of the original images F1 and F2, such as a solar picture or a subject S4 in this example. When the user completes the angle of view adjustment process for all the original images, the user advances the processing to a purchase process in step S800.

In step S900, the user executes the purchase process. In the purchase process, the user can determine the payment method and touch a purchase icon (not shown) for purchase. More specifically, the user can print out a purchase application form at a fee (e.g., 10 yen) on the image forming apparatus 300, for example.

The purchase application may include a list of reduced displays of the adjusted high-quality images, the contents of the service (the number and size of each DPE, the presence or absence of provision of high-quality image data), and the QR code (registered trademark). The user passes the purchase application to the cashier, who reads the QR code (registered trademark) with the bar code reader. As a result, the cash register displays the name of the purchased item and the payment amount, and the service is provided in response to the user's payment.

For example, the image forming apparatus 300 may scan the DPE print to order additional printing of the DPE print. Further, the image processing apparatus 100 may store the candidate frame image in a user area registered in the user database 142 and set for the user so that the angle of view can be changed during the additional printing.

As described above, in the high-quality image providing process according to the embodiment, the photography date and time as the attribute data of the image data acquired by the digital camera 600 owned by the user and the information of the angle of view determined by the user by the zoom operation of the digital camera 600 or the like are used, and a still image desired by the user can be extracted from the moving image data acquired by the five commercial high-resolution video cameras 400. As a result, the user can obtain a desired image (DPE print or image data) by improving the image quality and adjusting the angle of view while reducing the burden of photography at the time of photography with the digital camera 600.

Modification

The present disclosure can be implemented not only in the above-mentioned embodiments but also in the following modifications.

Modification 1: In the above embodiment, a user extracts an image desired by the user by setting the angle of view using the zooming function or the telephoto lens of the digital camera 600 owned by the user, but the present disclosure does not necessarily assume the use of the zooming function or the telephoto lens of the digital camera 600.

Figure 9:
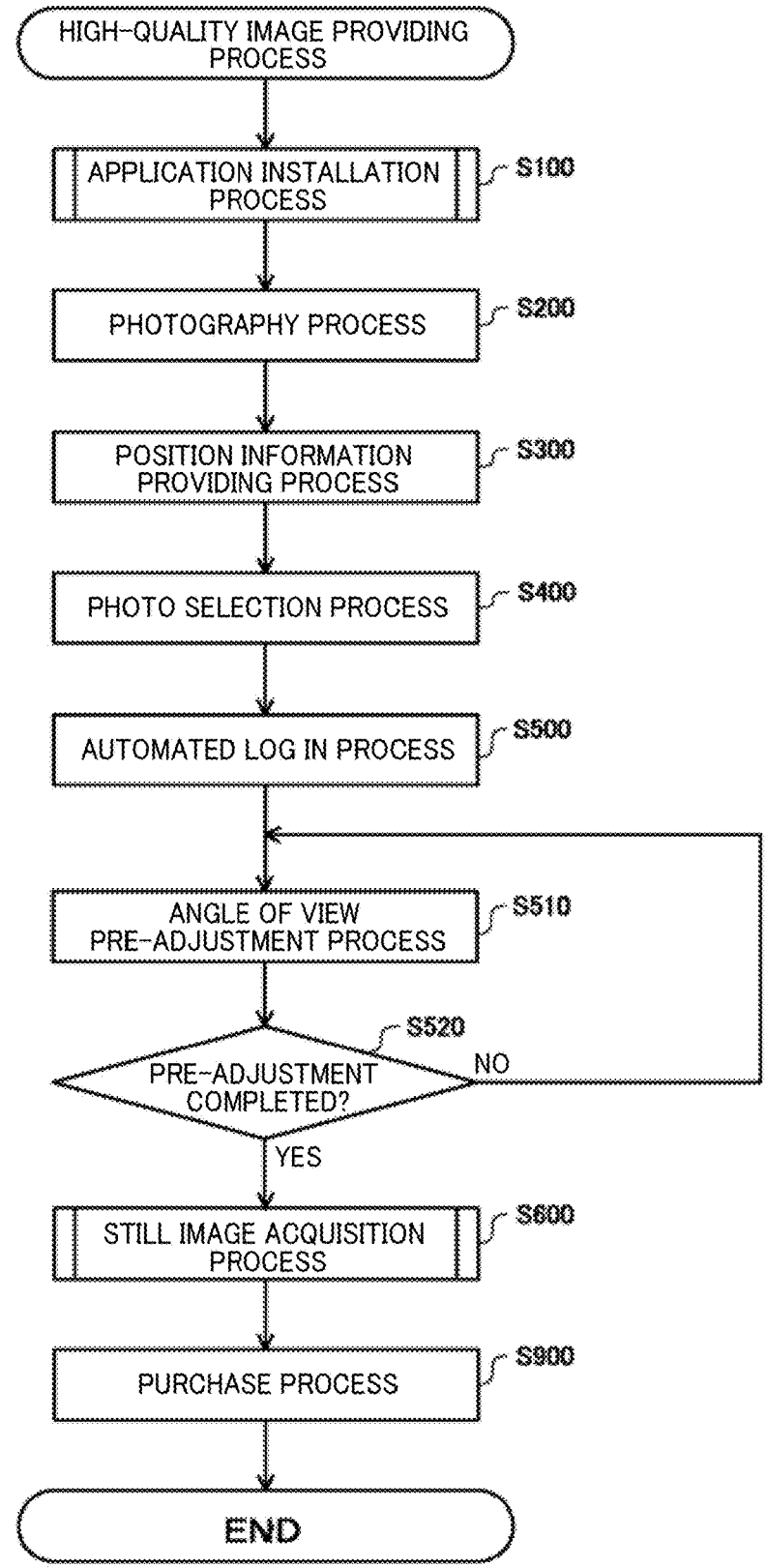
FIG. 9 is a flowchart showing the contents of a high-quality image providing process according to a modification.

FIG. 9 is a flowchart showing the contents of a high-quality image providing process according to a modification. The high-quality image providing process according to the modification differs from the above embodiment in that an angle of view pre-adjustment process (step S510 and step S520) is performed before the still image acquisition process (step S600) instead of the angle of view adjustment process (step S700 and step S800) that is performed after the still image acquisition process (step S600).

Figure 10A:
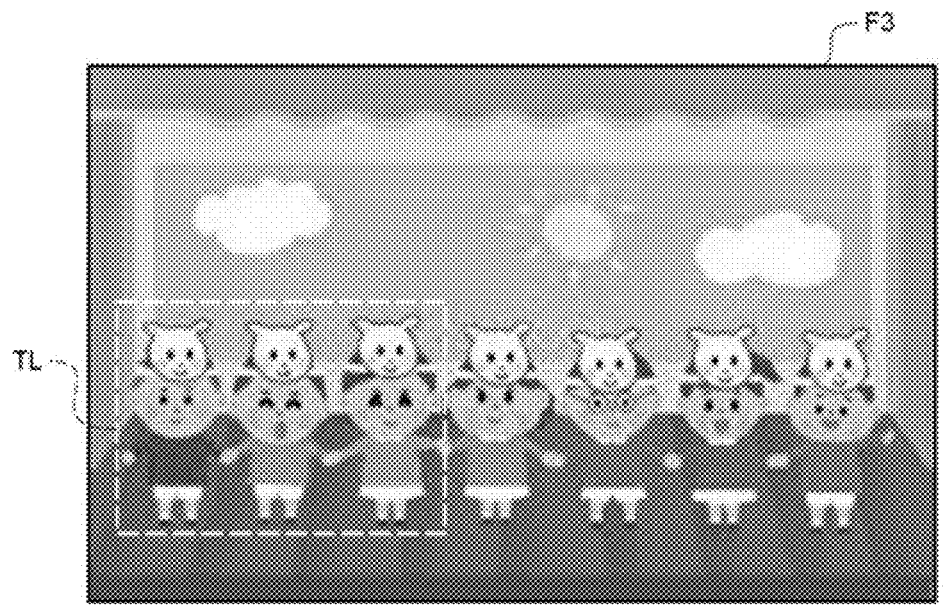
FIGS. 10A and 10B are explanatory diagrams each showing an angle of view adjustment process according to a modification.
Figure 10B:
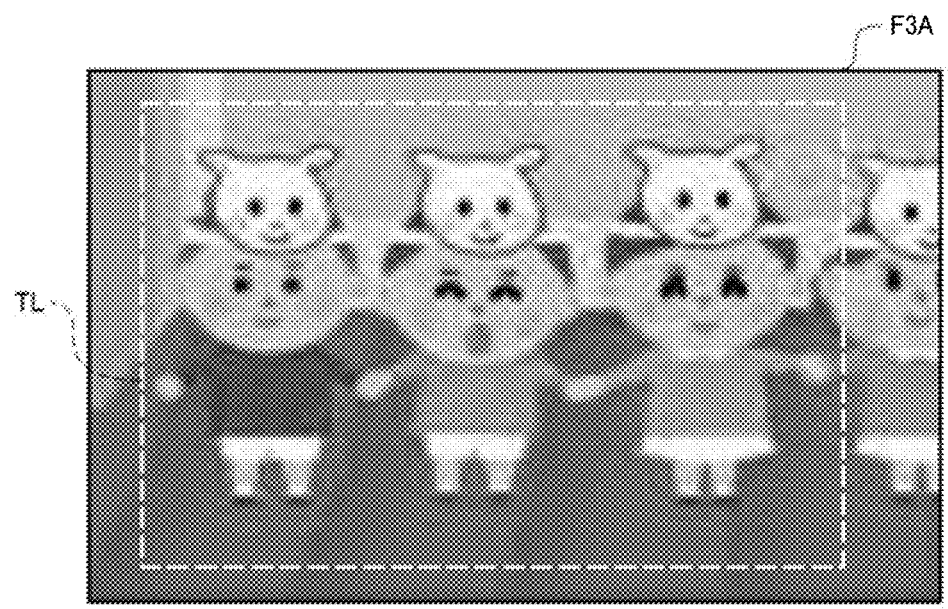

FIGS. 10A and 10B are explanatory diagrams showing an angle of view adjustment process according to a modification. FIG. 10A shows the original image F3 acquired using the imaging unit 260 of the smartphone 200. The original image F3 is displayed on the display 231 of the smartphone 200. The user can set an angle of view region (a region surrounded by the angle of view setting line TL) which is a partial region of the still image by dragging the angle of view setting line TL on the original image F3. The angle of view region is an angle of view region set based on a user input, and is used in the image processing apparatus 100 as angle of view setting information. The image data representing the original image F3 is also called image extraction image data.

FIG. 10B shows the original image F3a in a state in which the angle of view region is enlarged by the pinch-out operation. The user can confirm the image while finely adjusting the angle of view in a state in which the angle of view region is enlarged. In this state, the angle of view region has a low-resolution image quality due to the enlargement of the angle of view region. The image analysis unit 112 selects a frame image that matches the original image F3 from among the candidate pieces of frame image data as extracted from a plurality of pieces of frame image data before and after the photography date and time of the original image, and extracts and displays a high-quality angle of view region. The user can adjust the angle of view while checking the angle of view region of higher image quality.

Modification 2: While a high-quality still image is provided in the above embodiment, moving image data such as a short movie may be provided. The angle of view may be fixed or panned according to the subject. In this modification, the image represented by the frame image data includes not only a still image but also a moving image.

Modification 3: In the above embodiment, moving image data is generated by the commercial high-resolution video cameras 400 according to the processing defined in MPEG-4 (ISO/IEC 14496) or H.264 as an example, but the present disclosure is not limited to such moving image data. It is also possible to use continuous photographs (e.g., 10 fps) or to only make key frames constitute continuous photographs. The moving image data herein has a broad meaning and includes continuous photographs.

Modification 4: While the smartphone is used as the user side terminal in the above embodiment, a device that can function as the user side terminal, such as a tablet or a personal computer, can also be used. Further, when the user information and the user's settlement information are registered in the user database 142, the settlement can be performed by a personal computer or a smartphone.

What is claimed is:

1. An image processing apparatus that provides a frame image extracted from moving image data acquired from a moving image data acquiring device that photographs an event, the image processing apparatus comprising:
    a communication interface that accepts, from a user photographing terminal, still image data representing a still image acquired by photographing the event using the user photographing terminal, and photographing information included in the still image data; and
    a processor that:
        extracts frame image data from the moving image data using a photography time included in the photographing information of the still image data, the frame image data being photographed at a timing corresponding to the photography time included in the still image data; and
        (i) performs, based on angle of view information of the still image data adjusted by the user photographing terminal, adjustment of an angle of view on an image represented by the frame image data and including a region indicated by the angle of view information, and (ii) transmits a plurality of candidates of the frame image data including a candidate region to the user photographing terminal wherein the region indicated by the angle of view information includes a region of the still image represented by the still image data.

2. The image processing apparatus according to claim 1, wherein
    the photographing information includes photography date and time information representing date and time of photography to acquire the still image data, and
    the processor extracts the frame image data using the photography date and time information.

3. The image processing apparatus according to claim 1, wherein
    the region of the still image includes a region that occupies part of the still image represented by the still image data and is set based on a user input.

4. An image providing system to provide an image extracted from moving image data acquired by photographing an event, the image providing system comprising:
    the image processing apparatus according to claim 1; and
    a moving image data acquiring apparatus configured to photograph the event to acquire the moving image data.

5. An image processing method for providing a frame image extracted from moving image data acquired from a moving image data acquiring device that photographs an event, comprising:
    accepting and inputting, from a user photographing terminal, still image data representing a still image acquired by photographing the event using the user photographing terminal, and photographing information included in the still image data;
    using a photography time included in the photographing information of the still image data to extract frame image data, which is photographed at a timing corresponding to the photography time included in the still image data, from the moving image data; and
    (i) performing, based on angle of view information of the still image data adjusted by the user photographing terminal, adjustment of an angle of view on an image represented by the frame image data and including a region indicated by the angle of view information, and (ii) transmits a plurality of candidates of the frame image data including a candidate region to the user photographing terminal wherein the region indicated by the angle of view information includes a region of the still image represented by the still image data.

6. A non-transitory computer-readable recording medium storing an image processing program for controlling an image processing apparatus that provides a frame image extracted from moving image data acquired from a moving image data acquiring device that photographs an event, the image processing program causing a computer including a processor to execute:
- accepting, from a user photographing terminal, still image data representing a still image acquired by photographing the event using the user photographing terminal, and photographing information included in the still image data;
- extracting frame image data from the moving image data using a photography time included in the photographing information of the still image data, the frame image data being photographed at a timing corresponding to the photography time included in the still image data; and
- (i) performing, based on angle of view information of the still image data adjusted by the user photographing terminal, adjustment of an angle of view on an image represented by the frame image data and including a region indicated by the angle of view information, and (ii) transmits a plurality of candidates of the frame image data including a candidate region to the user photographing terminal wherein the region indicated by the angle of view information includes a region of the still image represented by the still image data.

* * * * *